United States Patent
Park

(10) Patent No.: US 9,429,734 B2
(45) Date of Patent: *Aug. 30, 2016

(54) VOICE COIL MOTOR AND DRIVING METHOD THEREOF

(71) Applicant: Sangok Park, Seoul (KR)

(72) Inventor: Sangok Park, Seoul (KR)

(73) Assignee: LG Innotek Co., Ltd., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/204,715

(22) Filed: Mar. 11, 2014

(65) Prior Publication Data

US 2014/0192428 A1  Jul. 10, 2014

Related U.S. Application Data

(63) Continuation of application No. 13/882,440, filed as application No. PCT/KR2011/001141 on Feb. 22, 2011.

(30) Foreign Application Priority Data

Nov. 2, 2010  (KR) .......................... 10-2010-0108427

(51) Int. Cl.
*G02B 7/09* (2006.01)
*H02K 33/18* (2006.01)
(Continued)

(52) U.S. Cl.
CPC . *G02B 7/09* (2013.01); *G02B 7/08* (2013.01); *H02K 33/18* (2013.01); *H02K 41/0356* (2013.01)

(58) Field of Classification Search
CPC ............... H02K 41/0354; H02K 41/0356; H02K 33/16; H02K 33/18; H02P 25/027; H02P 25/028; G02B 7/08; G02B 7/09; G02B 7/102

USPC ........................................ 359/824; 310/12.16
See application file for complete search history.

(56) References Cited

U.S. PATENT DOCUMENTS

| 4,297,537 A | 10/1981 | Babb |
| 6,414,931 B1 | 7/2002 | Maeda et al. |
| 7,787,046 B2 | 8/2010 | Nagasaki ...................... 348/374 |

(Continued)

FOREIGN PATENT DOCUMENTS

| CN | 101193204 A | 6/2008 |
| CN | 101261351 A | 9/2008 |

(Continued)

OTHER PUBLICATIONS

Maschine translation of Sue Takeshi "lens Drive Device" JP2007-248964, Sep. 27, 2007.*

(Continued)

*Primary Examiner* — Thomas K Pham
*Assistant Examiner* — Marin Pichler
(74) *Attorney, Agent, or Firm* — KED & Associates LLP

(57) ABSTRACT

A voice coil motor (VCM) is disclosed, the VCM including: a stator including a magnet generating a first electromagnetic field; a mover including a bobbin formed with a hollow hole through which light passes and a coil formed on a periphery of the bobbin that generates a second electromagnetic field responsive to the first electromagnetic field; a base fixed at the stator and formed with an opening through which the light passes; and at least one elastic member elastically supporting the bobbin and forming a gap between the bobbin and the base when the coil is not applied with a current.

15 Claims, 5 Drawing Sheets

(51) Int. Cl.
*G02B 7/08* (2006.01)
*H02K 41/035* (2006.01)

(56) References Cited

U.S. PATENT DOCUMENTS

| | | | |
|---|---|---|---|
| 2004/0001603 A1 | 1/2004 | Sahyoun | |
| 2005/0275294 A1* | 12/2005 | Izumi et al. | 310/15 |
| 2006/0181632 A1 | 8/2006 | Makii et al. | |
| 2008/0024015 A1 | 1/2008 | Tanioka et al. | |
| 2008/0095524 A1* | 4/2008 | Hsiao | G03B 17/02 396/133 |
| 2008/0124068 A1* | 5/2008 | Kwon | G02B 7/38 396/127 |
| 2008/0198254 A1 | 8/2008 | Nagasaki | 348/335 |
| 2008/0259467 A1 | 10/2008 | Chung | |
| 2009/0015948 A1 | 1/2009 | Wada et al. | 359/824 |
| 2009/0085425 A1 | 4/2009 | Chang | 310/273 |
| 2009/0102403 A1* | 4/2009 | Lule | 318/135 |
| 2011/0236008 A1 | 9/2011 | Kang et al. | |

FOREIGN PATENT DOCUMENTS

| | | |
|---|---|---|
| JP | 2006-042408 A | 2/2006 |
| JP | 2006-058662 | 3/2006 |
| JP | 2007-248964 A | 9/2007 |
| JP | 2008-020668 A | 1/2008 |
| JP | 2008-035645 A | 2/2008 |
| JP | 2008-178242 A | 7/2008 |
| JP | 2008-268404 A | 11/2008 |
| JP | 2008-281863 A | 11/2008 |
| JP | 2009-136081 A | 6/2009 |
| JP | 2009-150922 A | 7/2009 |
| JP | 2009-237192 A | 10/2009 |
| JP | 2009-271204 A | 11/2009 |
| JP | 2009-282090 A | 12/2009 |
| KR | 20-0376032 Y1 | 3/2005 |
| KR | 10-2006-0004253 | 1/2006 |
| KR | 10-0548869 B1 | 2/2006 |
| KR | 10-2006-0092067 A | 8/2006 |
| KR | 10-2007-0057595 A | 6/2007 |
| KR | 10-2008-0076841 A | 8/2008 |
| KR | 10-2009-0004286 A | 1/2009 |
| KR | 10-2009-0032905 A | 4/2009 |
| KR | 10-2009-0071686 | 8/2009 |
| KR | 10-2010-0082829 | 7/2010 |
| KR | 10-2011-0013966 A | 2/2011 |
| KR | 10-2011-0106664 A | 9/2011 |
| TW | 200915704 A | 4/2009 |

OTHER PUBLICATIONS

International Written Opinion dated Oct. 20, 2011 issued in Application No. PCT/KR2011/001141.
International Search Report dated Oct. 20, 2011 issued in Application No. PCT/KR2011/001141.
International Preliminary Report on Patentability dated May 7, 2013 issued in Application No. PCT/KR2011/001141.
Korean Trial No. 2012100002687 a dated Aug. 23, 2013 (with English Translation).
United States Office Action dated Oct. 24, 2014 issued in U.S. Appl. No. 13/882,440.
Korean Office Action dated Oct. 12, 2011 issued in Application No. 10-2010-0108427 (Full English Translation).
Korean Trial No. 2012100002687 A (with English Translation).
Japanese Office Action dated May 20, 2014 issued in Japanese Application No. 2013-536482 (Full English Translation).
Chinese Office Action issued in Application No. 201180052659.6 dated Jul. 22, 2015.
U.S. Office Action dated Jul. 14, 2015 issued in U.S. Appl. No. 13/882,440.
European Search Report for Application 15164805.2 dated Dec. 4, 2015.

* cited by examiner

VOICE COIL MOTOR AND DRIVING METHOD THEREOF

CROSS-REFERENCE TO RELATED APPLICATIONS

This application is a Continuation Application of prior U.S. patent application Ser. No. 13/882,440 filed Apr. 29, 2013, which is a U.S National Stage Application under 35 U.S.C. §371 of PCT Application No. PCT/KR2011/01141, filed Feb. 22, 2011, which claims priority to Korean Patent Application No. 10-2010-0108427, filed Nov. 2, 2010, whose entire disclosures are hereby incorporated by reference.

BACKGROUND

1. Field

The present invention relates to a voice coil motor and a driving method of a voice coil motor. More particularly, the present invention is directed to a voice coil motor and a driving method of a voice coil motor configured to further improve the power consumption, size and quality of image in the voice coil motor.

2. Background

Recently, a mobile terminal embedded with a super small digital camera has been developed. A super small digital camera formed on a conventional mobile terminal is disadvantageous in that a gap between an image sensor adapted to change an outside light to a digital image or a digital picture and a lens cannot be adjusted. However, a lens driving device such as a voice coil motor adapted to adjust a gap between an image sensor and a lens has been recently developed to enable obtainment of an improved digital image or digital picture in a super small digital camera.

Generally, a voice coil motor is configured such that a lens is mounted therein, a bobbin arranged on a base is upwardly moved from the base to adjust a gap between a lens and an image sensor mounted on a rear surface of the base. The bobbin of the voice coil motor is coupled with a leaf spring to allow the bobbin to contact the base at all times by way of elasticity of the leaf spring when the voice coil motor is not operated.

That is, the bobbin of the conventional voice coil motor is driven only to one upward direction relative to the base. The conventional voice coil motor that drives to one direction relative to the base inevitably and disadvantageously needs a driving force larger than that of the elasticity of the leaf spring and a self weight of the bobbin in order to drive the voice coil motor, resulting in increased power consumption of the voice coil motor.

Another disadvantage is that size of a coil wound on the bobbin or a magnet is increased by a driving force larger than the self weight of bobbin and elasticity of the leaf spring to drive the voice coil motor, resulting in an increased overall size of the voice coil motor.

Still another disadvantage is that a focus between the lens and the image sensor is not precisely adjusted to degrade quality of an image, if the leaf spring is deformed.

BRIEF DESCRIPTION OF THE DRAWINGS

Non-limiting exemplary embodiments of the present invention will be described in detail with reference to the accompanying drawings. Like reference numerals refer to like parts or portions throughout the description of several views of the drawings.

DETAILED DESCRIPTION

Embodiments of the present invention are described below by way of example only. These examples represent the best ways of putting the invention into practice that are currently known to the Applicant although they are not the only ways in which this could be achieved.

This invention may be embodied in various forms and should not be construed as limited to the embodiments set forth herein. Rather, these embodiments are provided so that this disclosure will be thorough and complete, and will fully convey the scope of the invention to those skilled in the art.

Figure 1:
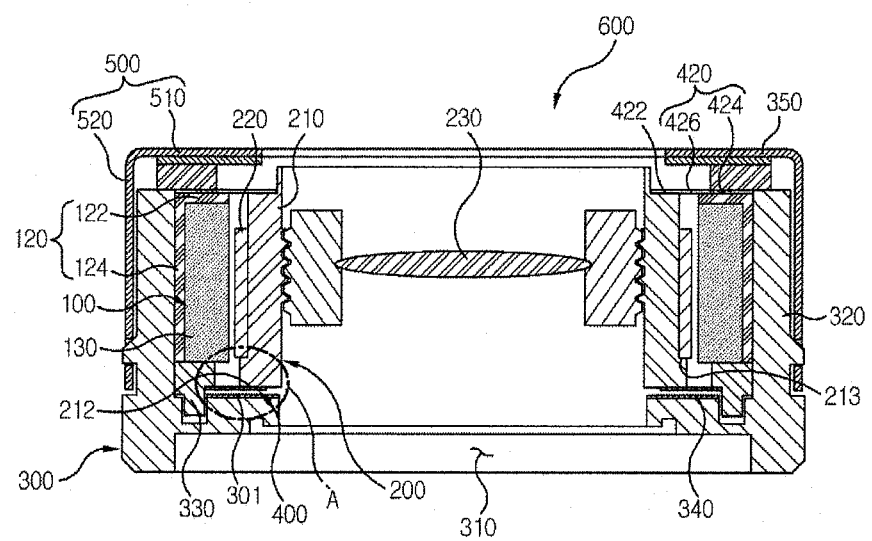
FIG. 1 is a cross-sectional view illustrating a voice coil motor according to an exemplary embodiment of the present invention.
Figure 2:
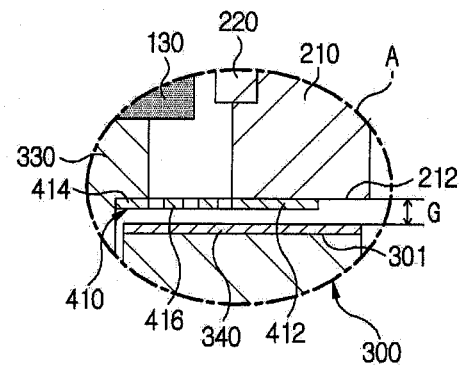
FIG. 2 is a partial enlarged view of 'A' of FIG. 1.

FIG. 1 is a cross-sectional view illustrating a voice coil motor according to an exemplary embodiment of the present invention, and FIG. 2 is a partial enlarged view of 'A' of FIG. 1.

Referring to FIGS. 1 and 2, a voice coil motor (600) may include a stator (100), a mover (200), a base (300) and an elastic member (400).

The stator (100) may include a yoke (120) and a magnet (130). The stator (100) generates a first electromagnetic field for driving the mover (200. described later). The yoke (120) may include a yoke upper plate (122) and a yoke lateral plate (124). The yoke (120) functions to block the electromagnetic field generated by the magnet (130. described later) and the mover (200), and improves a driving efficiency of the mover (200) by causing the electromagnetic field not facing the mover (200) among the electromagnetic field generated by the magnet (130) to face the mover (200).

The yoke upper plate (122) may take the shape of a square plate, when seen on a plane, and may be centrally formed with an opening for exposing a lens (described later) of the mover (200). The yoke lateral plate (124) may be extended from an edge of the yoke upper plate (122) to form a space for accommodating the magnet (130) by way of the yoke lateral plate (124) and the yoke upper plate (122).

A plurality of magnets (130) may be fixed on an inner lateral surface of the yoke lateral plate (124) to generate the first electromagnetic field for driving the mover (200). The mover (200) may include a bobbin (210) and a coil block (220), and be fixed therein by a lens barrel and a lens (230). The mover (200) moves relative to the stator (100) to adjust a gap between an image sensor arranged underneath the base (300. described later) and the lens (230).

The bobbin (210) may take the shape of a cylinder formed with a hollow hole, for example, and be formed therein with a thread for fixing the lens (230). The bobbin (210) may be formed at a bottom periphery with a sill (213) for fixing the coil block (220. described later).

The coil block (220) may be fixed at a periphery of the bobbin (210).

The coil block (220) may be formed by directly winding a wire insulated by enamel resin on a periphery of the bobbin (210), or by winding a wire in a cylindrical shape and bonding the wound wire on the periphery of the bobbin (210) using an adhesive.

The coil block (220) may generate a second electromagnetic field by way of a current applied from outside, and an attractive force and a repulsive force may be generated between the mover (200) and the stator (100) by a direction of a current applied to the coil block (220).

The base (300) may take the shape of a plate to fix the stator (100), and may be centrally formed with an opening (310) through which light having passed the lens (230) embedded in the bobbin (210) of the mover (200).

Each of four corners on an upper surface of the plate-shaped base (300) may be formed with a coupling pillar (320), and the coupling pillar (320) may function to couple a can (described later) to the base (300). The base (300) may be fixed at a rear surface thereof with an image sensor that generates an image corresponding to the light that has passed the lens (230). A frame-shaped spacer (330) may be arranged between the base (300) and the magnet (130) of the stator (100).

The elastic member (400) may include a first elastic member (410) and a second elastic member (420). The elastic member (400) may elastically support the bobbin (210) of the mover (200). The elastic member (400) may form a gap (G) between a bottom surface (212) of the bobbin (210) and an upper surface (301) of the base (300) when no current is applied to the coil (220).

In the exemplary embodiment of the present invention, in a case the mover (200) is distanced from the upper surface (301) of the base (300) when no current is applied to the coil using the elastic member (400), the mover (200) may be driven either to a downward direction facing the base (300) or to an upward direction distancing from the base (300) according to changed current direction.

That is, in a case the mover (200) is distanced from the upper surface (301) of the base (300) using the elastic member (400) when no current is applied to the coil (220), the mover (200) may be driven either to a downward direction or to an upward direction in a still state.

The first elastic member (410) may be elastically coupled to the bottom surface (212) of the bobbin (210) facing the base (300). Two first elastic members (410) may be formed, each member being elastically insulated from the other. Any one first elastic member (410) may be electrically connected to a distal end of the wire forming the coil block (220), and the other first elastic member (410) may be electrically connected to the other distal end facing the distal end of the wire.

Now, referring to FIG. 2, each of the first elastic members (410) may commonly include an inner elastic unit (412), an outer elastic unit (414) and a connection elastic unit (416).

The inner elastic unit (412) may be coupled to the bottom surface (212) of the bobbin (210), the outer elastic unit (414) may be coupled by the spacer (330) and the connection elastic unit (416) may elastically connect the inner elastic unit (412) and the outer elastic unit (414). The connection elastic unit (416) may be formed by bending the thin narrow-width linear type elastic member, when viewed on a plane.

Each of the outer elastic unit (414) of the first elastic members (410) may be partially protruded, and the protruded portion is bent along a lateral surface of the base (300) to be electrically connected to an outside circuit substrate. A current is applied to each outer elastic unit (414) of the first elastic members from the outside circuit substrate, and the current provided to the each outer elastic unit (414) is provided to the coil block (220), whereby the second electromagnetic field for ascending/descending the mover (200) is generated from the coil block (220).

The second elastic member (420) may be elastically coupled to the upper surface (214) facing the bottom surface (212) of the bobbin (210) facing the base (300). The second elastic member (420) may include an inner elastic unit (422), an outer elastic unit (424) and a connection elastic unit (426).

The inner elastic unit (422) may be coupled to the upper surface (214) facing the bottom surface (212) of the bobbin (210), the outer elastic unit (424) may be arranged on the yoke upper plate (122) of the yoke (120), and the connection elastic unit (426) may be connected to the inner and outer elastic units (422, 424).

In the present exemplary embodiment, the inner elastic unit (412) of the first elastic member (410) connected to the mover (200) and the inner elastic unit (422) of the second elastic member (420) are arranged at a place lower than that of the outer elastic unit (414) because of a self weight of the mover (200) and gravity.

As a result, the gap (G) formed between the bottom surface (212) of the bobbin (210) and an upper surface (301) of the base (300) is preferably set up in consideration of droop of the inner elastic unit (422) caused by the self weight of the mover (200) and gravity.

In another exemplary embodiment, the connection elastic members (416, 426) may be deformed to allow the inner elastic units (412, 422) of the first and second elastic members (410, 420) to be formed at a position higher than that of the outer elastic units (414, 424), thereby preventing the mover (200) from drooping due to self weight of the mover (200) and the gravity.

In a case the inner elastic units (412, 422) of the first and second elastic members (410, 420) are placed on a high position than the outer elastic units (414, 424) in consideration of the droop of the mover (200) by self weight of the mover (200) and the gravity, the first and second elastic members (410, 420) may be arranged in parallel with the upper surface (301) of the base (300).

Referring back to FIG. 1, the voice coil motor (600) may further include a cover can (500).

The cover can (500) may include an upper plate (510) formed with an opening for exposing the lens (230) of the mover (200) and formed in the shape of a plate corresponding to the base (300), and a lateral plate (520) extended from an edge of the upper plate (510) to the base (300), where the lateral plate (520) is coupled to the lateral surface of the base (300).

Referring back to FIG. 1, the mover (200) according to an exemplary embodiment of the present invention may be driven to either a first direction facing the base (300) or a second direction opposite to the first direction. Therefore, the mover (200) may collide with the base (300) or the upper plate (510) of the cover can (500) while being driven to the first direction or to the second direction, whereby noise can be generated due to deformation of the first and second elastic members (410, 420) or collision. Therefore, the voice coil motor (600) may further include a first shock absorption member (340) and a second shock absorption member (350) in order to prevent generation of noise.

The first shock absorption member (340) may be formed on the upper surface (301) of the base (300) facing the bottom surface (212) of the bobbin (210), and the second shock absorption member (350) may be arranged at an inner lateral surface of the cover can (500) facing the upper surface (214) of the bobbin (210). The first shock absorption member (340) and the second shock absorption member (350) may include any one of a sponge, a synthetic resin having elasticity and a rubber.

Figure 3:
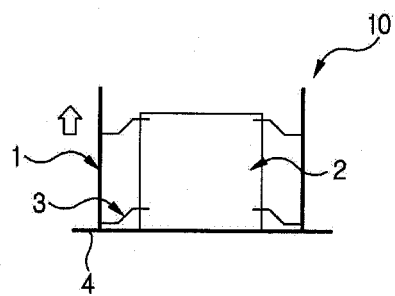
FIG. 3 is a cross-sectional view illustrating a conventional voice coil motor to compare with that of the exemplary embodiment of the present invention.
Figure 4:
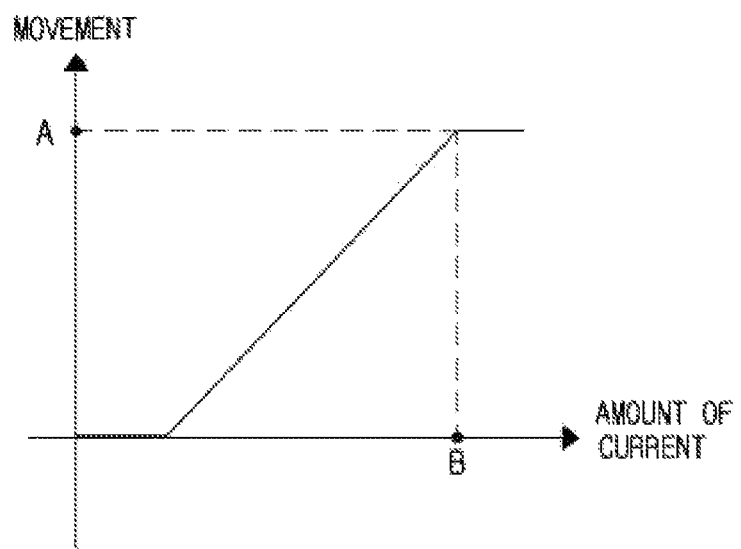
FIG. 4 is a graph illustrating a relation between a driving current amount for driving the voice coil motor of FIG. 3 and a moving amount according to the present invention.

FIG. 3 is a cross-sectional view of a conventional voice coil motor for comparing with the voice coil motor according to an exemplary embodiment of the present invention, and FIG. 4 is a graph illustrating a relation between an amount of driving current for driving the voice coil motor of FIG. 3 and movement.

Referring to FIGS. 3 and 4, a bobbin of a conventional voice coil motor (10) and a mover (2) including a coil block are elastically coupled to a stator (1) by an elastic member (3), and the mover (2) is arranged on a base (4) by the elastic member (3) generating elasticity pressing the mover (2) in a direction facing the base (4).

FIG. 3 shows a mover (2) that is not applied with a driving current for driving the mover (2).

A current is applied to the coil block of the mover (2) for adjusting a focus between an image sensor and the mover (2) by widening a gap between the image sensor arranged underneath the base (4) and a lens included in the mover (2), whereby an electromagnetic field is generated by the coil block.

The electromagnetic field generated by the coil block reacts with the electromagnetic generated by a magnet of the stator (1) to generate an ascending force to a direction facing an upper surface of the base (4). The ascending force increases in proportion to the intensity of the current applied to the coil block.

Referring to FIGS. 3 and 4, the mover (2) of the conventional voice coil motor (10) is not distanced from the base (4) until a current applied to the coil block by the elasticity (4) depressing the mover (2) downward according to a self weight of the mover (2) and gravity reaches a point of start current of a horizontal axis in the graph of FIG. 4.

As shown in the graph of FIG. 4, in a case the current applied to the coil block is greater than the start current, the ascending force applied to the mover (2) becomes greater than the self weight of the mover (2) and the elasticity of the elastic member (3), whereby the mover (2) is distanced from the base (4) of the mover (2).

Successively, the current applied to the coil block continuously increases to keep increasing a gap between the mover (2) and the base (4) until the current reaches a B point in the graph of FIG. 4.

Meanwhile, the elasticity of elastic member (3) also increases as the gap between the mover (2) and the base (4) continuously increases, whereby the mover (2) is distanced from an upper surface of the base (4) as much as A at a particular current (B). For example, in a case a current of approximately 80 mA is provided to the coil block, the mover (2) stops short of ascending further from a particular position.

Figure 5:
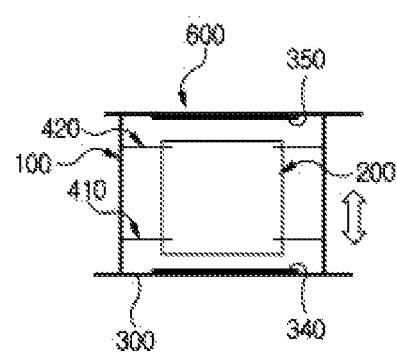
FIG. 5 is a schematic cross-sectional view illustrating a voice coil motor according to an exemplary embodiment of the present invention.
Figure 6:
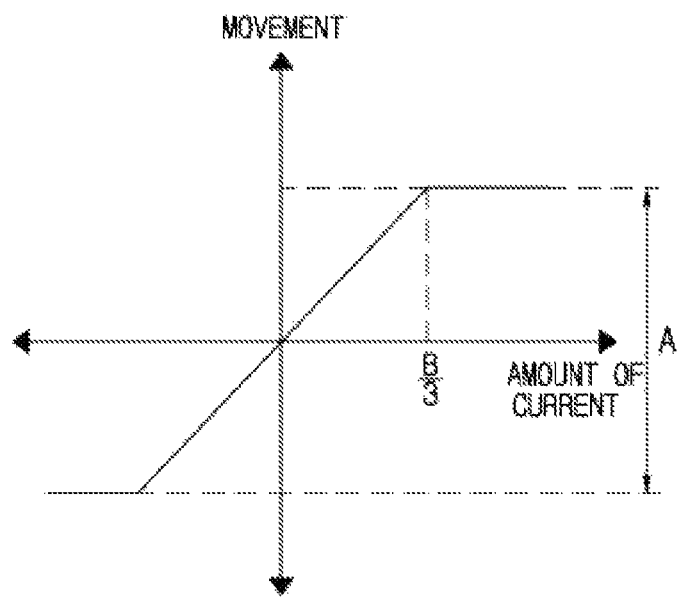
FIG. 6 is a graph illustrating a relation between a driving current amount for driving the voice coil motor of FIG. 5 and a moving amount according to the present invention.

FIG. 5 is a schematic cross-sectional view of a voice coil motor according to an exemplary embodiment of the present invention, and FIG. 6 is a graph illustrating a relation between a driving current for driving a voice coil motor and a movement.

Referring to FIGS. 1, 5 and 6, the mover (20) including a bobbin (210) and a coil block (220) is elastically coupled to the stator (100) by the first and second elastic members (410, 420) of the elastic member (400), and the mover (200) is distanced from the upper surface of the base (400) in a case a current is not applied to the b coil block (220) by the elasticity of the first and second elastic members (410, 420).

The coil block (220) of the mover (200) is applied with a current of forward direction, for example, in order to widen a gap between the image sensor arranged underneath the base (400) and the lens included in the mover (200), whereby a first electromagnetic field is generated from the coil block (220). The first electromagnetic field generated from the coil block (220) reacts with the electromagnetic generated by a magnet (130) of the stator (100) to generate an ascending force to a direction facing an upper surface of the base (400). The ascending force increases in proportion to the intensity of the forward current applied to the coil block (220).

As depicted in FIGS. 5 and 6, the elastic members (410, 420) of the voice coil motor (600) according to the exemplary embodiment of the present invention do not depress the mover (200) to a direction facing the base (300) when a current is not applied to the mover (200), such that, upon application of forward current to the coil block (220), the mover (200) starts to ascend to a first direction distancing from the upper surface of the base (300).

Now, a current in an area where Y axis becomes a positive number in the graph of FIG. 6 is defined as a "forward current", while a current in an area where Y axis becomes a negative number in the graph of FIG. 6 is defined as a "backward current".

Furthermore, because the mover (200) of the voice coil motor (600) according to the exemplary embodiment of the present invention has been already distanced from the base before the forward current is applied to the mover (200), even a small amount of current of an approximately 25 mA (approximately ⅓ of 80 mA necessary for reaching the A point in the conventional voice coil motor illustrated in FIG. 4) is sufficient enough to reach the A point.

That is, in the exemplary embodiment of the present invention, even a small amount of current can ascend the mover (200) to a desired position, because the mover (200) is already in a position distanced from the upper surface of the base (300) before the current is applied to the coil block (220), using the first and second elastic members (410, 420).

Meanwhile, a current of backward direction (instead of forward direction) is applied to the coil block (220) in order to drive the mover (200) of the voice coil motor (600) according to the exemplary embodiment of the present invention to a second direction approaching the base (300).

A descending force is generated on the coil block (220) by the electromagnetic field generated by the backward current applied to the coil block (220) and the electromagnetic field generated by the magnet (130), and the mover (200) is moved to a direction facing the upper surface (301) of the base (300) by the descending force to allow the mover (200) to be arranged on the upper surface (301) of the base (300).

Figure 7:
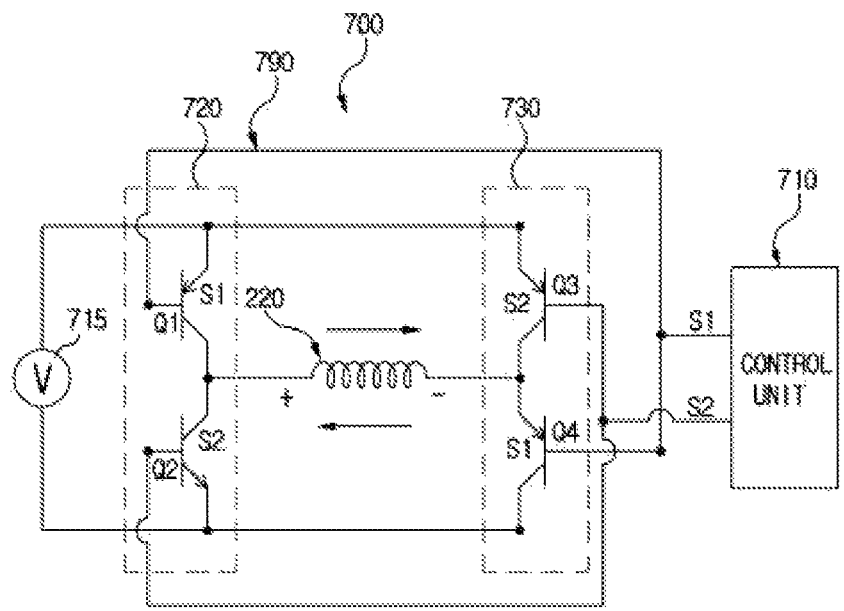
FIG. 7 is a block diagram illustrating a driving circuit for ascending or descending a mover of a voice coil motor according to an exemplary embodiment of the present invention.

FIG. 7 is a block diagram illustrating a driving circuit for ascending or descending a mover of a voice coil motor according to an exemplary embodiment of the present invention.

Referring to FIGS. 1 and 7, the mover (200) is distanced from the upper surface (301) of the base (300) by the first and second elastic members (410, 420) when no current is applied to the coil block (220) of the mover (200), and the mover (200) is driven to a first direction facing the upper surface (301) of the base (300) or a second direction opposite to the first direction by the current applied to the coil block (220) of the mover (200) distanced from the upper surface (301) of the base (300).

A voice coil motor (800) may include a driving module (700) for changing the flow of current applied to the coil block (220) in order to drive the mover (200) to any one direction of the first direction and the second direction. The driving module (700) may include a control unit (710) and a current providing unit (790).

The control unit (710) is electrically connected to an outside circuit substrate to generate an ascending control signal (S1) and a descending control signal (S2).

The ascending control signal (S1) is a control signal for increasing the gap between the bobbin (210) of the voice coil motor and the upper surface (301) of the base (300), and the descending control signal (S2) is a control signal for decreasing the gap between the bobbin (210) of the voice coil motor and the upper surface (301) of the base (300).

The current providing unit (790) provides to the coil block (220) a current of forward direction" for increasing the gap between the mover (200) and the upper surface (301) of the base (300) in response to the ascending control signal (S1), and the current providing unit (790) also provides to the coil block (220) a current of backward direction" for decreasing the gap between the mover (200) and the upper surface (301) of the base (300) in response to the descending control signal (S2).

The current providing unit (790) may include a power source (715), a first unit circuitry (720) and a second unit circuitry (730).

The first unit circuitry (720) may include first and second switch elements (Q1, Q2). In the exemplary embodiment of the present invention, the first and second switch elements (Q1, Q2) may be respectively transistors including input terminals, output terminals and gates. The output terminal of the first switch element (Q1) is connected to the output terminal of the second switch terminal (Q2).

The second unit circuitry (730) may include third and fourth switch elements (Q3, Q4). In the exemplary embodiment of the present invention, the third and fourth switch elements (Q3, Q4) may be respectively transistors including input terminals, output terminals and gates. The output terminal of the third switch element (Q3) is connected to the output terminal of the fourth switch terminal (Q4).

In the exemplary embodiment of the present invention, the first and second switch elements (Q1, Q2) are connected to the power source (715) in parallel. That is, input terminals of the first and second switch elements (Q1, Q2) at the first unit circuitry (720) and the input terminals of the third and fourth switch elements (Q3, Q4) at the second unit circuitry (730) are respectively inputted by a current provided from the power source (715).

Meanwhile, output terminals of the first and second switch elements (Q1, Q2) at the first unit circuitry (720) and the output terminals of the third and fourth switch elements (Q3, Q4) at the second unit circuitry (730) are respectively and electrically connected to one distal end of a line comprising the coil block (220) and the other end facing the one distal end.

In terms of operation, the ascending control signal (S1) outputted from the control unit (710) is applied to a gate of the first switch element (Q1) and to a gate of the fourth switch element (Q4). The descending control signal (S2) outputted from the control unit (710) is electrically connected to a gate of the second switch element (Q2) and to a gate of the third switch element (Q3).

Figure 8:
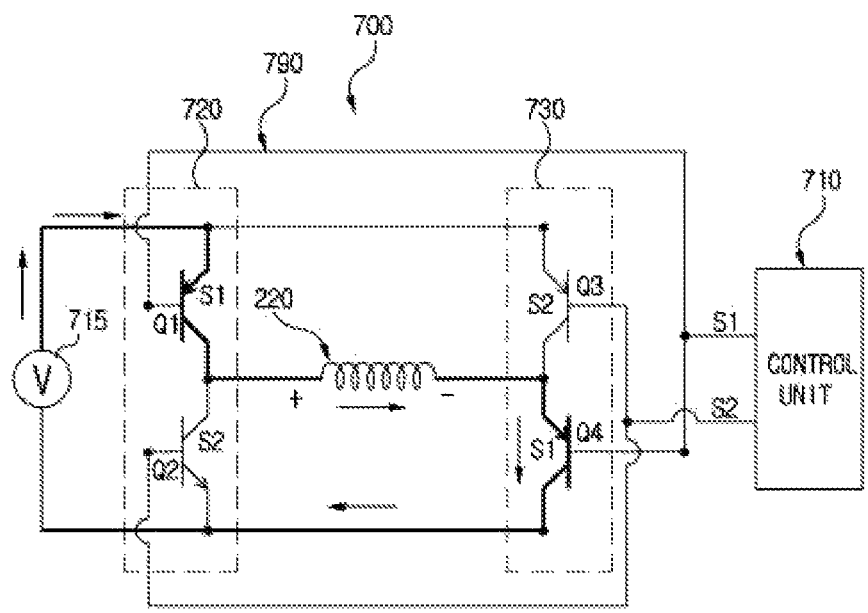
FIGS. 8 and 9 are block diagrams illustrating a forward direction current and a backward direction current applied to a coil block by a driving circuit.

Therefore, as illustrated in FIG. 8, in a case the ascending control signal (S1) is outputted from the control unit (710), the ascending control signal (S1) is also applied to the gate of the first switch element (Q1) and the gate of the fourth switch element (Q4). That is, the first switch element (Q1), the coil block (220), the fourth switch element (Q4) and the power source (715) form a closed circuit to thereby apply a "current of forward direction" to the coil block (220).

The gap between the mover (200) of the voice coil motor (700) and the upper surface (301) of the base (300) increases as the current of forward direction is applied to the coil block (220).

Figure 9:
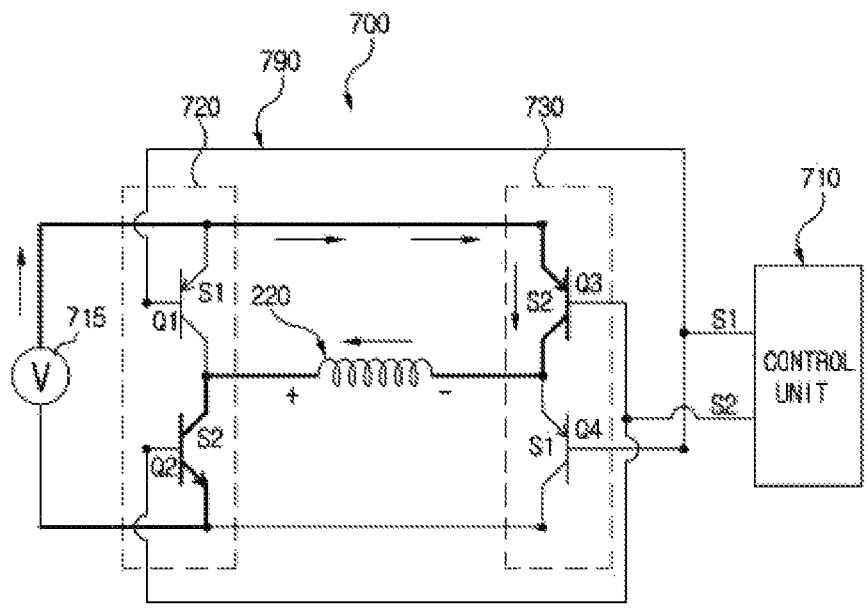

Meanwhile, as illustrated in FIG. 9, in a case the descending control signal (S2) is outputted from the control unit (710), each gate of the first and second switch elements (Q1, Q2) is also applied with the descending control signal (S2). As a result, the third switch element (Q3), the coil block (220), the second switch element (Q2) and the power source (715) form a closed circuit to thereby apply a "current of backward direction" to the coil block (220) that is opposite to the current of forward direction. In a case a "current of backward direction" is applied to the coil block (220), the gap between the mover (200) of the voice coil motor (700) and the upper surface (301) of the base (300) decreases.

In the present exemplary embodiment of the present invention, although a configuration is explained and illustrated in which four switch elements (Q1, Q2, Q3, Q4) are used to variably control the directions of current flowing in the coil block (220), the directions of current flowing in the coil block (220) may be changed using various other electrical elements.

In the present exemplary embodiment of the present invention, although a configuration is explained and illustrated in which four switch elements (Q1, Q2, Q3, Q4) are used to variably control the directions of current flowing in the coil block (220), a voltage difference across the coil block (220) may be adjusted to ascend or descend the bobbin (210) by applying a voltage across the coil block (220).

Now, a method for driving a voice coil motor according to an exemplary embodiment of the present invention will be described.

Figure 10:
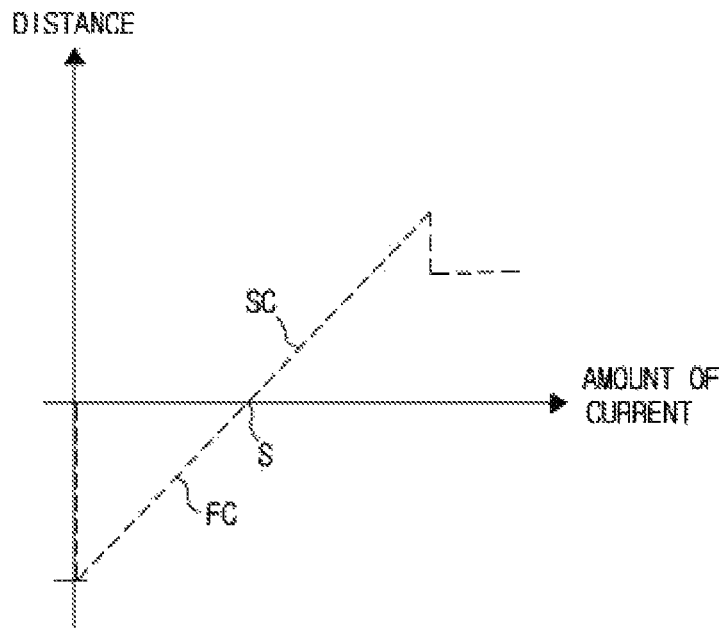
FIGS. 10 and 11 are graphs illustrating a method for driving a voice coil motor according to the present invention.

Referring to FIGS. 1 and 10, the current of backward direction (FC) is applied to the coil block (220) to move the bobbin (210) to the reference position, where the coil block (220) is arranged at a place distanced from the upper surface (301) of the base (300) fixed by the magnet (130) of the voice coil motor (700), elastically supported by elastic member (400) including first and second elastic members (410, 420), and embedded with the lens (230).

The reference position in the exemplary embodiment of the present invention may be the upper surface (301) of the base (300).

Successively, the current of backward direction (FC) is increased on the coil block (220) to distance the bobbin (210) from the reference position, and if the bobbin (210) reaches an initial position (S), a current of forward direction (SC) is applied. The current of forward direction (SC) may increase continuously or in a stair formation.

Thereafter, the current of forward direction (SC) is maintained at a constant level when an optimum focus that is required by a lens (230) fixed at the bobbin (210) and the image sensor module is formed, to thereby stop the bobbin (210) at a position corresponding to that of the optimum focus.

Using the process of stopping the bobbin (210) at a position corresponding to the optimum focus, a process of moving the bobbin (210) to a place a bit deviated from the position of the optimum focus and a process of a bit decreasing the current of forward direction to the coil block (220), the bobbin (210) can be returned to a position of the optimum focus, whereby a fine focusing process is performed to minutely adjust a focus between the lens (230) of the bobbin (210) and the image sensor module.

Successively, an object and the optimum focus are formed between the image sensor module and the lens (230), where the image sensor module generates an image of the object.

Figure 11:
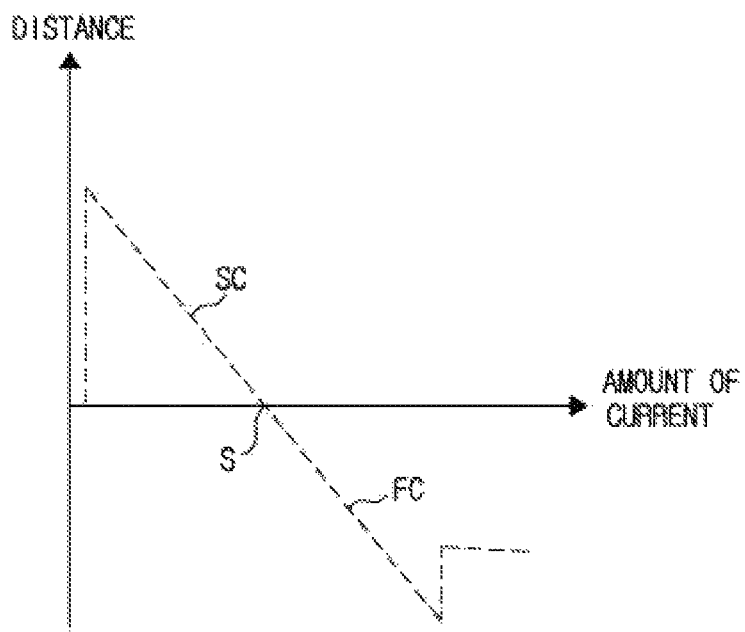

Meanwhile, referring to FIGS. 1 and 11, the current of forward direction (SC) is applied to the coil block (220) to move the bobbin (210) to the reference position, where the coil block (220) is arranged at a place distanced from the upper surface (301) of the base (300) fixed by the magnet (130) of the voice coil motor (700), elastically supported by elastic member (400) including first and second elastic members (410, 420), and embedded with the lens (230).

The reference position in the exemplary embodiment of the present invention may be an inner lateral surface of the upper surface (501) of the cover can (510).

Successively, the current of forward direction (SC) is decreased on the coil block (220) to distance the bobbin (210) from the upper plate (510) of cover can (510) which is the reference position, and if the bobbin (210) reaches an initial position (S), a current of backward direction (FC) is applied. The current of backward direction (FC) may increase continuously or in a stair formation.

Thereafter, the current of backward direction (FC) is maintained at a constant level when an optimum focus that is required by a lens (230) fixed at the bobbin (210) and the image sensor module is formed, to thereby stop the bobbin (210) at a position corresponding to that of the optimum focus.

Using the process of stopping the bobbin (210) at a position corresponding to the optimum focus, a process of moving the bobbin (210) to a place a bit deviated from the position of the optimum focus and a process of a bit increasing the current of backward direction (SC) to the coil block (220), the bobbin (210) can be returned to a position of the optimum focus, whereby a fine focusing process is performed to minutely adjust a focus between the lens (230) of the bobbin (210) and the image sensor module.

Successively, an object and the optimum focus are formed between the image sensor module and the lens (230), where the image sensor module generates an image of the object.

Although the method for driving the voice coil motor according to exemplary embodiment of the present invention has described a method in which the bobbin (210) is brought into contact with any one of the upper surface (301) of the base (300) or an inner lateral surface of the upper plate (510) of the cover can (500) to set up a reference position, and a current is applied to the coil block (220) until the bobbin (210) reaches a position formed by the image sensor module and the optimum focus from the reference position to thereby adjust a focus between the mover (200) and the image sensor module, another method may be alternatively applied in which the bobbin (210) is moved to a reference position by applying a first current to the coil block (220) that is elastically supported at a place distanced from the upper surface (301) of the base fixed by the magnet (130), and embedded with the lens (230), a data is calculated for maintaining an optimum focus between the lens (230) and the image sensor module based on the object, and an amount of current corresponding to the data is applied to the coil block (220) to move the bobbin (210) to the reference position based on the data.

At this time, the amount of current may have the intensity corresponding to the data, and the reference position may be the inner lateral surface of the upper plate (510) or the upper surface (301) of the base (300).

In order to achieve at least the above objects, in whole or in part, and in accordance with the purpose of the disclosure, as embodied and broadly described, there is provided a voice coil motor comprising: a stator including a magnet generating a first magnetic field; a mover including a bobbin with an opening formed therein for transmitting light therethrough and a coil block disposed on an outer circumference surface of the bobbin and for generating a second magnetic field that interacts with the first magnetic field; a base for fixing the stator and having an opening for transmitting the light; and at least one elastic member that flexibly supports the bobbin and allows the bobbin and the base to be spaced apart from each other when current is not supplied to the coil block, wherein: the elastic member comprises two electrically insulated portions, one of the two portions is electrically connected to one end of a wire constituting a coil of the coil block, the other one of the two portions is electrically connected to the other one opposite to the one end of the wire, and the bobbin supported by the elastic member is driven in any one of a first direction away from the base due to ascending force generated by the first and second magnetic fields and a second direction toward the base due to descending force generated by the first and second magnetic fields.

In some exemplary embodiment of the present invention, driving of the bobbin in any one of the first direction and the second direction may comprise moving the bobbin to a reference location to align the bobbin; and forward current is supplied to the coil when the bobbin is driven in the first direction, and reverse current flowing in an opposite direction to the forward current is supplied to the coil when the bobbin is driven in the second direction.

In some exemplary embodiment of the present invention, the bobbin may be driven in any one of the first direction and the second direction by adjusting a voltage difference between opposite ends of the coil.

In another general aspect of the present invention, there is provided a voice coil motor a stator including a magnet generating a first magnetic field; a mover including a bobbin with an opening formed therein for transmitting light therethrough and a coil block disposed on an outer circumference surface of the bobbin and for generating a second magnetic field that interacts with the first magnetic field; a base for fixing the stator and having an opening for transmitting the light; and at least one elastic member that flexibly supports the bobbin and allows the bobbin and the base to be spaced apart from each other when current is not supplied to the coil block, wherein the at least one elastic member comprises two electrically connected portions, one of the two portions is electrically connected to one end of a wire constituting a coil of the coil block, and the other one of the two portions is electrically connected to the other one opposite to the one end of the wire; and a driving module including a controller configured to generate each of an ascending control signal for ascending the bobbin and a descending control signal for descending the bobbin, and a current supplying unit configured to supply one of forward current and revere current to the coil block in response to the ascending and descending control signals of the controller.

In some exemplary embodiment of the present invention, the current supplying unit may comprise a first circuit in which first and second switch devices are connected in series, and a second circuit in which to third and fourth switch devices are connected in series; the first and second circuits are electrically connected in parallel to a power source; a first end of the coil block is connected between the first and second switch devices; and a second end of the coil block is connected between the third and fourth switch devices.

In some exemplary embodiment of the present invention, the ascending control signal may be applied to the first and fourth switch devices to supply the forward current to the coil block; and the descending control signal is applied to the second and third switch devices to supply the reverse current to the coil block.

In another general aspect of the present invention, there is provided a method of driving a voice coil motor, the method comprising: aligning a bobbin having a lens therein and flexibly supported by an elastic member at a location spaced apart from a base to which a magnet is fixed by supplying first current to a coil wound on the bobbin to move the bobbin to a reference location; spacing the bobbin apart from the reference location by reducing an amount of the first current supplied to the coil or supplying second current flowing in an opposite direction to the first current; and stopping the bobbin to a location corresponding to an optimal focus by maintaining an amount of the first current or the second current when the optimal focus is formed between the lens and an image sensor module disposed below the bobbin.

In some exemplary embodiment of the present invention, the reference location may be any one of an upper surface of the base and an internal lateral surface of a cover can for covering the bobbin.

In some exemplary embodiment of the present invention, the spacing the bobbin from the reference location may comprise continuously increasing the first current or the second current.

In some exemplary embodiment of the present invention, the stopping of the bobbin to the location corresponding to the optimal focus may comprise moving the bobbin to be deviated from the location of the optimal focus; and resupplying the first current to the coil or reducing the amount of the second current to restore the bobbin to the location of the optimal focus.

In still another general aspect of the present invention, there is provided a method of driving a voice coil motor, the method comprising: aligning a bobbin having a lens therein and flexibly supported by an elastic member at a location spaced apart from a base to which a magnet is fixed, by supplying first current to a coil wound on the bobbin to move the bobbin to a reference location; calculating data for forming an optimal focus between a lens and an image sensor module based on an object; and moving the bobbin from the reference location based on the data by reducing an amount of the first current or supplying second current flowing in an opposite direction to the first current to the coil in response to the data.

In some exemplary embodiment of the present invention, the first current or the second current may have constant intensity.

Technical problems to be solved by the present invention are not restricted to the above-mentioned description, and any other technical problems not mentioned so far will be clearly appreciated from the following description by skill in the art.

The voice coil motor and a method for driving the voice coil motor according to the present invention has an advantageous effect in that a bobbin mounted with a lens is distanced from an upper surface of a base mounted with an image sensor, and a mover including the bobbin is driven to a direction distanced from the base or a direction approaching the base by applying a forward current or a backward current to a coil block wound on the bobbin, to reduce power consumption of the voice coil motor and to adjust a focus between the lens and the image sensor within a rapid period of time.

The voice coil motor and a method for driving the voice coil motor according to the present invention has another advantageous effect in that a contact noise generated by driving of the bobbin can be reduced.

As apparent from the foregoing, the present invention has an industrial applicability in that a bobbin mounted with a lens is distanced from an upper surface of a base mounted with an image sensor, and a current of forward direction or backward direction is applied to a coil block wound on the bobbin to drive the mover including the bobbin to a direction distancing from the base or approaching the base, whereby power consumption by the voice coil motor can be reduced to adjust a focus between the lens and the image sensor within a faster period of time and to reduce a contact noise caused by driving of the bobbin.

While the present invention has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

What is claimed is:

1. A method of driving a voice coil motor that includes a stator including a magnet for generating a first magnetic field and a base, a mover including a bobbin and a coil block wound on the bobbin, at least one elastic member includes a first elastic member coupled to a lower portion of the bobbin and a second elastic member coupled to an upper portion of the bobbin, and a cover for covering the mover and having an upper plate and a lateral plate, the upper plate having an opening, and the lateral plate extending from an edge of the upper plate to the base to be coupled to a lateral surface of the base, the method for obtaining an optimum focus between a lens and an image sensor disposed below the bobbin comprising steps of:

providing the mover, at an initial position spaced apart both from the base by a first gap and from the cover by a second gap, wherein the bobbin is supported by the first elastic member and the second elastic member and is distanced from the base and the cover, respectively;

moving the mover provided at the initial position in a first direction, relative to the stator with the magnet, toward a first reference position by supplying a first current to the coil block such that the first gap decreases and the second gap increases, wherein the first direction is a direction from the initial position to the first reference position, and wherein the first current generates a second magnetic field that interacts with the first magnetic field, and the first reference position corresponds to an upper surface of the base;

moving the mover away from the first reference position by reducing an amount of the first current, and then supplying a second current to the coil block to move the mover in a second direction opposite to the first direction towards a second reference position, such that the mover moves past the initial position from the first reference position and the first gap increases and the second gap decreases;

stopping the mover at a position past the optimum focus by increasing the second current to the coil block and then returning the mover to a location corresponding to the optimum focus; and maintaining the mover at the location corresponding to the optimum focus by maintaining an amount of the second current, such that the optimum focus is formed between the first reference position and the second reference position.

2. The method of claim 1, wherein the step of moving the mover away from the first reference position is comprised of reducing the first current and supplying the second current continuously.

3. The method of claim 1, wherein at the step of stopping the mover, the bobbin is moved to be deviated from the location corresponding to the optimum focus, and then the bobbin returns to the location corresponding to the optimum focus by resupplying the first current to the coil block or reducing the amount of the second current.

4. The method of claim 1, wherein the mover is configured to move a maximum vertical distance when the second gap decreases until a portion of the bobbin contacts the cover, and wherein the second reference position corresponds to an inside of the upper plate of the cover.

5. The method of claim 1, wherein the first reference position is the upper surface of the base.

6. The method of claim 1, wherein the second reference position is the inner surface of the upper plate of the cover or corresponds to the inner surface of the upper plate of the cover.

7. The method of claim 1, wherein the step of moving the mover away from the first reference position is comprised of reducing the first current and supplying the second current in a stair formation.

8. The method of claim 1, wherein when the first current is provided to the coil block at the initial position, the mover supported by the first elastic member and the second elastic member is moved to the first reference position.

9. The method of claim 1, wherein when the second current is provided to the coil block at the initial position, the mover supported by the first elastic member and the second elastic member is moved to the second reference position.

10. The method of claim 7, wherein the first current flows in a direction opposite to the second current.

11. A method of driving a voice coil motor that includes a stator including a magnet for generating a first magnetic field and a base, a mover including a bobbin and a coil block wound on the bobbin, at least one elastic member includes a first elastic member coupled to a lower portion of the bobbin and a second elastic member coupled to an upper portion of the bobbin, and a cover for covering the mover and having an upper plate and a lateral plate, the upper plate having an opening, and the lateral plate extending from an edge of the upper plate to the base to be coupled to a lateral surface of the base, the method for obtaining an optimum focus comprising steps of:

providing the mover, in absence of current for driving a lens to the coil block, at an initial position spaced apart from the base by a first gap and spaced apart from the cover by a second gap, wherein the bobbin is supported by the first elastic member and the second elastic member and is distanced from the base and the cover, respectively;

moving the mover provided at the initial position in a first direction relative to the stator with the magnet, toward a first reference position when a first current is provided to the coil block for generating a second magnetic field that interacts with the first magnetic field, such that the first gap decreases and the second gap increases, wherein the first direction is a direction from the initial position to the first reference position, and the first reference position corresponds to an upper surface of the base;

calculating data for forming the optimum focus between the lens and an image sensor; and moving the mover away from the first reference position based on the data by reducing an amount of the first current or supplying a second current flowing in an opposite direction to the first current to the coil block in response to the data to move the mover in a second direction opposite to the first direction toward a second reference position away from the first reference position, such that the first gap increases and the second gap decreases, and the mover moves past the initial position from the first reference position and then optimum focus is reached between the first reference position and the second reference position.

12. The method of claim 11, wherein the mover is configured to move a maximum vertical distance when the second gap decreases until a portion of the bobbin contacts the cover, and wherein the second reference position corresponds to an inside of the upper plate of the cover.

13. The method of claim 11, further comprising steps of:
moving the mover to a position deviated from the optimum focus by increasing the second current to the coil block; and
returning the mover to a location corresponding to the optimum focus by resupplying the first current to the coil block or reducing the amount of the second current.

14. The method of claim 11, wherein the first reference position is the upper surface of the base.

15. The method of claim 11, wherein the second reference position is the inner surface of the upper plate of the cover or corresponds to the inner surface of the upper plate of the cover.

* * * * *